US009601979B2

(12) United States Patent
Nakajima et al.

(10) Patent No.: US 9,601,979 B2
(45) Date of Patent: Mar. 21, 2017

(54) ALLOY MATERIAL FOR R-T-B SYSTEM RARE EARTH PERMANENT MAGNET, METHOD FOR PRODUCING R-T-B SYSTEM RARE EARTH PERMANENT MAGNET, AND MOTOR

(75) Inventors: Kenichiro Nakajima, Chichibu (JP); Takashi Yamazaki, Chichibu (JP)

(73) Assignee: SHOWA DENKO K.K., Tokyo (JP)

( * ) Notice: Subject to any disclaimer, the term of this patent is extended or adjusted under 35 U.S.C. 154(b) by 904 days.

(21) Appl. No.: 13/876,348

(22) PCT Filed: Sep. 2, 2011

(86) PCT No.: PCT/JP2011/070042
§ 371 (c)(1),
(2), (4) Date: Jun. 10, 2013

(87) PCT Pub. No.: WO2012/043139
PCT Pub. Date: Apr. 5, 2012

(65) Prior Publication Data
US 2013/0264903 A1    Oct. 10, 2013

(30) Foreign Application Priority Data

Sep. 30, 2010 (JP) ................................. 2010-221482

(51) Int. Cl.
| C22C 38/00 | (2006.01) |
| H02K 21/00 | (2006.01) |
| B22F 1/00 | (2006.01) |
| H01F 1/057 | (2006.01) |
| H01F 41/02 | (2006.01) |
| C22C 38/06 | (2006.01) |
| C22C 38/10 | (2006.01) |
| C22C 38/16 | (2006.01) |
| C22C 33/02 | (2006.01) |
| H01F 1/06 | (2006.01) |
| C22C 1/02 | (2006.01) |

(52) U.S. Cl.
CPC ........... *H02K 21/00* (2013.01); *B22F 1/0003* (2013.01); *C22C 1/02* (2013.01); *C22C 33/0278* (2013.01); *C22C 38/002* (2013.01); *C22C 38/005* (2013.01); *C22C 38/06* (2013.01); *C22C 38/10* (2013.01); *C22C 38/16* (2013.01); *H01F 1/0577* (2013.01); *H01F 1/06* (2013.01); *H01F 41/0266* (2013.01)

(58) Field of Classification Search
None
See application file for complete search history.

(56) References Cited

U.S. PATENT DOCUMENTS 4,747,874 A * 5/1988 Ghandehari .......... B22F 1/0003
75/254
5,405,455 A    4/1995 Kusunoki et al.

2004/0118484 A1*  6/2004 Nishizawa ............ H01F 1/0557
148/302
2006/0207689 A1*  9/2006 Iwasaki ................ H01F 1/0577
148/105
2009/0322459 A1  12/2009 Nagata et al.
2010/0045411 A1   2/2010 Kobayashi et al.
2010/0231338 A1   9/2010 Morimoto et al.

FOREIGN PATENT DOCUMENTS

| CN | 101689416 A | 3/2010 |
| CN | 101794651 A | 8/2010 |
| EP | 0994493 A2 | 4/2000 |
| JP | 63-25904 A | 2/1988 |
| JP | 2002-38245 A | 2/2002 |
| JP | 2007-266199 A | 10/2007 |
| JP | 2008-263243 A | 10/2008 |
| JP | 2009-249729 A | 10/2009 |
| JP | 4450239 B2 | 4/2010 |
| JP | 4483630 B2 | 6/2010 |
| WO | 2005/043558 A1 | 5/2005 |
| WO | 2007/088718 A1 | 8/2007 |
| WO | 2008/032667 A1 | 3/2008 |

OTHER PUBLICATIONS

Communication dated Jul. 15, 2014, issued by the State Intellectual Property Office of the People's Republic of China, in counterpart Application No. 201180046847.8.
Satoshi Sugimoto, "Recent Trend of the Researches for Reducing Dysprosium Usage in a Nd—Fe—B Sintered Magnet", J. Jpn. Soc. Powder Powder Metallurgy, 2010, pp. 395-400, vol. 57, No. 6.
W.F. Li et al., "Effect of post-sinter annealing on the coercivity and microstructure of Nd—Fe—B permanent magnets", Acta Materialia 57, 2009, pp. 1337-1346.

(Continued)

*Primary Examiner* — Jessee Roe
*Assistant Examiner* — Ngoclan T Mai
(74) *Attorney, Agent, or Firm* — Sughrue Mion, PLLC

(57) ABSTRACT

An alloy material for an R-T-B system rare earth permanent magnet having a high orientation rate and high coercivity (Hcj), and a method for producing an R-T-B system rare earth permanent magnet using the alloy material. The alloy material includes a plurality of R-T-B system alloys having different compositions and a metal powder. The respective R-T-B system alloys are formed of R which is composed of two or more kinds selected from rare earth elements, T which is composed of a transition metal essentially containing Fe, B, and unavoidable impurities. A first alloy having the greatest Dy content contains 17 mass % or greater of Dy, and a Dy concentration difference between the first alloy and a second alloy having the smallest Dy concentration difference with respect to the first alloy among the plurality of R-T-B system alloys is 5 mass % or greater.

5 Claims, 1 Drawing Sheet

(56) References Cited

OTHER PUBLICATIONS

Masashi Matsuura et al., "Influences of Oxidation and Cu Addition on Coercivity of Nd—Fe—B Thin Films", The papers of Technical Meeting on Magnetics, The Institute of Electrical Engineers of Japan, 2009, pp. 77-81, vol. MAG-09, No. 168-189.
International Search Report for PCT/JP2011/070042 dated Dec. 6, 2011.
Communication dated May 28, 2015 from the European Patent Office in counterpart European Application No. 11828700.2.

* cited by examiner

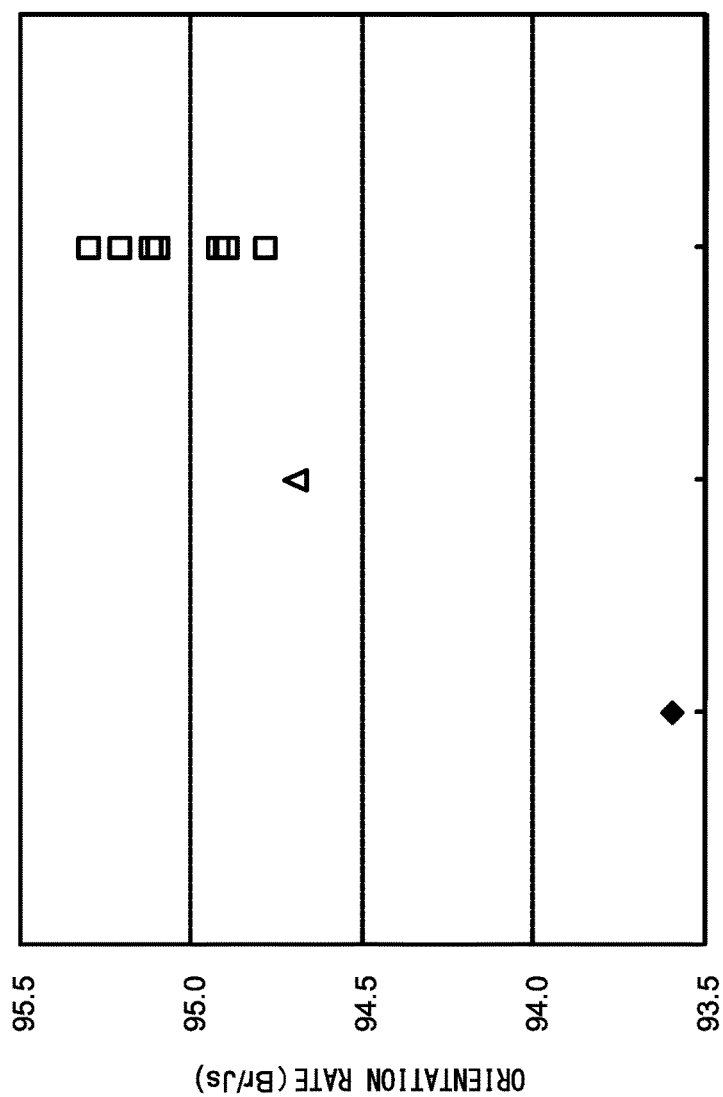

ALLOY MATERIAL FOR R-T-B SYSTEM RARE EARTH PERMANENT MAGNET, METHOD FOR PRODUCING R-T-B SYSTEM RARE EARTH PERMANENT MAGNET, AND MOTOR

CROSS REFERENCE TO RELATED APPLICATIONS

This application is a National Stage of International Application No. PCT/JP2011/070042 filed Sep. 2, 2011, claiming priority based on Japanese Patent Application No. 2010-221482 filed Sep. 30, 2010, the contents of all of which are incorporated herein by reference in their entirety.

TECHNICAL FIELD

The present invention relates to an alloy material for an R-T-B system rare earth permanent magnet, a method for producing an R-T-B system rare earth permanent magnet, and a motor, and particularly, to an alloy material for an R-T-B system rare earth permanent magnet from which an R-T-B system rare earth permanent magnet which has excellent magnetic properties and is favorably used in a motor is obtained, a method for producing an R-T-B system rare earth permanent magnet using the alloy material, and a motor.

BACKGROUND ART

Hitherto, R-T-B system rear earth permanent magnets (hereinafter, may be referred to as "R-T-B system magnet") have been used in motors such as voice coil motors of hard disk drives. Motors having an R-T-B system magnet incorporated in a rotor exhibit high energy efficiency. In recent years, demands for energy conservation have increased and the heat resistance property of R-T-B system magnets has been improved, whereby the amount of R-T-B system magnets which are used in various motors of home electronics, air conditioners, vehicles, and the like increases.

Generally, R-T-B system magnets are obtained by molding and sintering an R-T-B system alloy containing Nd, Fe, and B as main components. Generally, in R-T-B system alloys, R is Nd, a part of which is replaced by other rare earth elements such as Pr, Dy, and Tb. T is Fe, a part of which is replaced by other transition metals such as Co and Ni. B is boron and a part thereof can be replaced by C or N.

Generally, R-T-B system magnets are constituted by two phases, i.e., a main phase constituted by $R_2T_{14}B$ and an Nd-rich phase which is present at the grain boundaries of the main phase and has a higher Nd concentration than the main phase. The Nd-rich phase is also referred to as a grain boundary phase.

Since R-T-B system magnets which are used in motors of hybrid vehicles, electric vehicles, and the like are exposed to high temperatures in the motors, high coercivity (Hcj) is required. There is a technique for replacing R of an R-T-B system alloy from Nd to Dy as a technique for improving the coercivity of the R-T-B system magnet. However, Dy is unevenly distributed and its output is also limited. Accordingly, the supply of Dy is unstable.

Therefore, techniques for improving coercivity of an R-T-B system magnet without increasing the content of Dy contained in an R-T-B system alloy are examined. As such techniques, a method for depositing Dy from the outside of a sintered body of an R-T-B system alloy and spreading Dy to interior grain boundaries (for example, see PTLs 1 and 2), a method for applying fluoride of Dy or the like to a surface of a sintered body of an R-T-B system alloy (for example, see PTL 3), a method for obtaining a core shell-type structure by adding a raw material having a high Dy concentration (for example, see NPL 1), and the like are examined.

In addition, regarding an expression mechanism of coercivity of an R-T-B system magnet, results of analysis on effects due to a heat treatment are reported. Specifically, there is a report in which a very thin amorphous layer is formed at the grain boundaries due to a heat treatment and a Cu-condensed phase is thus present together with an Nd-rich phase (for example, see NPL 2), or in which wettability between Nd-rich phases is improved due to a liquid phase which is present due to the presence of Cu (for example, see NPL 3).

In addition, generally, when producing an R-T-B system magnet, an alloy having a microstructure is pulverized into grains having a size of 4 μm to 6 μm using a jet mill or the like, and molded and sintered while being oriented in a magnetic field.

In addition, an effort is also made to make the powder into a finer powder having a grain size of up to 3 μm or less in the pulverization of the alloy to thereby reduce the size of the magnet grains obtained after sintering, thereby improving coercivity and thus reducing the amount of Dy (for example, see PTL 4).

In addition, a method for producing a rare earth sintered magnet including the steps of: preparing a mixed powder by mixing a first fine alloy powder and a second fine alloy powder having different compositions; obtaining a green body by pressing the mixed powder while applying a reversal magnetic field as an orienting magnetic field; and obtaining a sintered body by sintering the green body is proposed as a technique for obtaining a sintered magnet having a high orientation rate (for example, see PTL 5).

CITATION LIST

Patent Literature

[PTL 1] PCT International Publication No. WO 2007/088718 Pamphlet
[PTL 2] PCT International Publication No. WO 2008/032667 Pamphlet
[PTL 3] Japanese Patent No. 4450239
[PTL 4] Japanese Unexamined Patent Application, First Publication No. 2008-263243
[PTL 5] Japanese Patent No. 4483630

Non-Patent Literature

[NPL 1] Sugimoto, Powder and Powder Metallurgy, Vol. 57, No. 6, pp 395 to 400 (2010)
[NPL 2] W. F. Li et. al, Acta Materialia, 57, pp 1337 to 1346 (2009)
[NPL 3] Matsuura et. al, The Papers of Technical Meeting on Magnetics, The Institute of Electrical Engineers of Japan, Vol. MAG-09, No. 168 to 189, pp 77 to 81 (2009)

SUMMARY OF INVENTION

Technical Problem

However, in the conventional techniques, it is difficult to realize an R-T-B system magnet having high coercivity and a high orientation rate as shown as follows.

That is, when a Dy concentration in an R-T-B system alloy is increased, an R-T-B system magnet having high coercivity (Hcj) is obtained after sintering. However, when the Dy concentration in the R-T-B system alloy is increased, remanence (Br) of the R-T-B system magnet is reduced.

In addition, when an R-T-B system magnet is produced using a mixed powder obtained by mixing alloy powders having different kinds of rare earth elements and different concentrations, an orientation rate of an R-T-B system magnet can be increased, and thus remanence (Br) of the R-T-B system magnet can be improved. However, even when the R-T-B system magnet is produced using the mixed powder, coercivity (Hcj) of the obtained R-T-B system magnet is insufficient and it is required to improve the coercivity while securing a high orientation rate.

The invention is contrived in view of the above-described circumstances, and an object of the invention is to provide an alloy material for an R-T-B system rare earth permanent magnet having a high orientation rate and high coercivity (Hcj), and a method for producing an R-T-B system rare earth permanent magnet using the alloy material.

Another object of the invention is to provide a motor using an R-T-B system rare earth permanent magnet having excellent magnetic properties which is produced by the method for producing an R-T-B system rare earth permanent magnet.

Solution to Problem

Inventors of the invention have repeated intensive studies in order to solve the above-described problems. As a result, they have found that when an alloy material for an R-T-B system rare earth permanent magnet includes a plurality of alloys composed of R-T-B system alloys having different compositions and a metal powder, the alloy material becomes an alloy material for an R-T-B system rare earth permanent magnet using which an R-T-B system magnet having a high orientation rate (Bras) and high coercivity (Hcj) is obtained.

It is presumed that this effect is obtained due to the following actions.

That is, pulverizability of the R-T-B system alloy in the production of the alloy powder by pulverizing the R-T-B system alloy varies with the amount of the rare earthes contained in the R-T-B system alloy. Accordingly, for example, when a plurality of kinds of R-T-B system alloy powders are produced by simultaneously or separately pulverizing a plurality of kinds of alloys composed of R-T-B system alloys having different compositions, since the pulverizability varies with the microstructures and alloy compositions of the start alloys, a plurality of kinds of R-T-B system alloy powders having different grain size distributions are obtained even when the pulverization is performed under the same conditions.

It is thought that when a mixed powder obtained by mixing such a plurality of kinds of R-T-B system alloy powders is molded using a magnetic field and sintered, fine crystal grains included in the mixed powder, which cause a reduction in the orientation rate, are incorporated in larger crystal grains and lost, and thus the orientation rate of the R-T-B system magnet is improved. Furthermore, it is assumed that when a metal powder containing no rare earth elements is added to the mixed powder, effects of improving the wettability of the grain boundary phase which is a nonmagnetic phase and the inherent coercivity of the magnetic grains themselves are obtained.

However, even when using the alloy material for an R-T-B system rare earth permanent magnet which includes a plurality of alloys composed of R-T-B system alloys having different compositions and a metal powder, coercivity of an R-T-B system magnet which is obtained by sintering the alloy material may be insufficient. Accordingly, the inventors of the invention have focused their attention on the content of Dy contained in the plurality of alloys composed of R-T-B system alloys and have repeated intensive studies.

As a result, they have found that when a plurality of alloys composed of R-T-B system alloys having different compositions and a metal powder are included, an R-T-B system alloy having the greatest Dy content included in the plurality of alloys contains 17 mass % or greater of Dy, and a Dy concentration difference between the R-T-B system alloy having the greatest Dy content and another R-T-B system alloy having the least Dy concentration difference with respect to the R-T-B system alloy having the greatest Dy content is 5 mass % or greater, alloys having a small Dy content are easily oriented at the time of molding using a magnetic field as compared with alloys having a large Dy content, and a high orientation rate (Br/Js) can be achieved, and since wettability of the main phase and the grain boundary phase is improved by adding the metal powder, an R-T-B system magnet having sufficiently high coercivity (Hcj) is obtained, and have thought up the invention.

That is, the invention provides the following inventions.

(1) An alloy material for an R-T-B system rare earth permanent magnet, including: a plurality of R-T-B system alloys having different compositions; and a metal powder, in which the respective R-T-B system alloys are formed of R which is composed of two or more kinds selected from rare earth elements, T which is composed of a transition metal essentially containing Fe, B, and unavoidable impurities, a first alloy having the greatest Dy content among the plurality of R-T-B system alloys contains 17 mass % or greater of Dy, and a Dy concentration difference between the first alloy and a second alloy having the least Dy concentration difference with respect to the first alloy among the plurality of R-T-B system alloys is 5 mass % or greater.

(2) The alloy material for an R-T-B system rare earth permanent magnet according to (1), in which the metal powder includes one or two or more selected from Al, Fe, Si, Ta, Ti, and Zr, or an alloy containing the metals.

(3) The alloy material for an R-T-B system rare earth permanent magnet according to (1) or (2), in which the metal powder is included in an amount of 0.02 mass % to 6 mass %.

(4) The alloy material for an R-T-B system rare earth permanent magnet according to any one of (1) to (3), in which a Dy content in the composition when all of the plurality of R-T-B system alloys having different compositions are mixed is 2 mass % to 20 mass %.

(5) A method for producing an R-T-B system rare earth permanent magnet, including the steps of: molding the alloy material for an R-T-B system rare earth permanent magnet according to any one of (1) to (4); and sintering the alloy material.

(6) A motor including: an R-T-B system rare earth permanent magnet which is produced by the method for producing an R-T-B system rare earth permanent magnet according to (5).

Advantageous Effects of Invention

An alloy material for an R-T-B system rare earth permanent magnet of the invention includes a plurality of R-T-B system alloys having different compositions and a metal powder, the respective R-T-B system alloys are formed of R which is composed of two or more kinds selected from rare earth elements, T which is composed of a transition metal essentially containing Fe, B, and unavoidable impurities, a first alloy having the greatest Dy content among the plurality of R-T-B system alloys contains 17 mass % or greater of Dy, and a Dy concentration difference between the first alloy and a second alloy having the least Dy concentration difference with respect to the first alloy among the plurality of R-T-B system alloys is 5 mass % or greater. Accordingly, by molding and sintering the alloy material, it is possible to provide an R-T-B system rare earth permanent magnet with a high orientation rate and high coercivity which is favorably used in a motor and has excellent magnetic properties.

BRIEF DESCRIPTION OF DRAWING

FIG. 1 is a graph showing orientation rates of Test Examples 1 to 20.

DESCRIPTION OF EMBODIMENTS

Hereinafter, embodiments of the invention will be described in detail.

"Alloy Material for R-T-B System Rare Earth Permanent Magnet"

An alloy material for an R-T-B system rare earth permanent magnet (hereinafter, abbreviated as "alloy material for a permanent magnet") of this embodiment includes a plurality of R-T-B system alloys having different compositions and a metal powder.

The respective R-T-B system alloys included in the alloy material for a permanent magnet is formed of R which is composed of two or more kinds selected from rare earth elements, T which is composed of a transition metal essentially containing Fe, B, and unavoidable impurities.

In the alloy material for a permanent magnet of this embodiment, a first alloy having the greatest Dy content among the plurality of R-T-B system alloys contains 17 mass % or greater of Dy. In addition, a Dy concentration difference between the first alloy and a second alloy having the least Dy concentration difference with respect to the first alloy among the plurality of R-T-B system alloys is 5 mass % or greater.

When the Dy content of the first alloy is less than 17 mass % or the Dy concentration difference between the second alloy and the first alloy is less than 5 mass %, large amounts of powders in which the orientation is insufficient remain, and thus the orientation rate is not sufficiently improved.

Regarding the composition when all of the plurality of R-T-B system alloys having different compositions are mixed (hereinafter, "mixed alloy composition"), R is 27 mass % to 35 mass %, and preferably 30 mass % to 32 mass %, B is 0.85 mass % to 1.3 mass %, and preferably 0.87 mass % to 0.98 mass %, and T is preferably formed of the remainder and unavoidable impurities in order to obtain an R-T-B system magnet having excellent magnetic properties.

When R contained in the mixed alloy composition is less than 27 mass %, coercivity of an R-T-B system magnet which is obtained using this material may be insufficient, and when R is greater than 35 mass %, there is a concern that remanence (Br) of the R-T-B system magnet becomes insufficient.

In addition, when B contained in the mixed alloy composition is less than 0.85 mass %, coercivity of an R-T-B system magnet which is obtained using this material may be insufficient, and when B is greater than 1.3 mass %, there is a concern that remanence of the R-T-B system magnet is significantly reduced.

In addition, examples of rare earth elements other than Dy included in R of the respective R-T-B system alloys include Sc, Y, La, Ce, Pr, Nd, Pm, Sm, Eu, Gd, Tb, Ho, Er, Tm, Yb, and Lu. Among them, Nd, Pr, and Tb are particularly preferably used. In addition, R of the respective R-T-B system alloys preferably has Nd as a main component.

In addition, the content of Dy contained in the mixed alloy composition is preferably 2 mass % to 20 mass %, more preferably 2 mass % to 10 mass %, and even more preferably 4 mass % to 10 mass %. It is not preferable that Dy contained in the mixed alloy composition be 20 mass % or greater, because even when the alloy material for a permanent magnet includes a metal powder, the effect of improving coercivity of the R-T-B system magnet by increasing the Dy content cannot be obtained and remanence (Br) of the R-T-B system magnet is significantly reduced. When Dy contained in the mixed alloy composition is 2 mass % or less, there is a concern that the effect of improving the coercivity of the R-T-B system magnet due to inclusion of Dy cannot be sufficiently obtained.

T contained in the respective R-T-B system alloys is composed of a transition metal essentially containing Fe. Examples of transition metals other than Fe contained in T of the respective R-T-B system magnets include Co and Ni. It is preferable that T of the R-T-B system magnet contain Co other than Fe, because Tc (Curie temperature) can be improved.

In addition, B contained in the respective R-T-B system alloys is composed of boron, but a part thereof can be replaced by C or N.

In addition, the mixed alloy composition preferably includes one or two or more selected from Al, Cu, and Ga in order to improve the coercivity of the R-T-B system magnet.

Ga is preferably contained in an amount of 0.03 mass % to 0.3 mass % in the mixed alloy composition. It is preferable that Ga be contained in an amount of 0.03 mass % or greater in the mixed alloy composition, because the coercivity of the R-T-B system alloy can be effectively improved. However, it is not preferable that the content of Ga in the mixed alloy composition be greater than 0.3 mass %, because remanence of the R-T-B system magnet is reduced.

In addition, the lower the oxygen concentration in the alloy material for a permanent magnet, the more preferable. However, even when oxygen is contained in an amount of 0.03 mass % to 0.5 mass % in the alloy material for a permanent magnet, sufficient magnetic properties can be achieved. When the content of oxygen contained in the alloy material for a permanent magnet is greater than 0.5 mass %, there is a concern that the magnetic properties are significantly reduced. The content of oxygen contained in the alloy material for a permanent magnet is preferably 0.05 mass % to 0.2 mass %.

In addition, the lower the carbon concentration in the alloy material for a permanent magnet, the more preferable. However, even when carbon is contained in an amount of 0.003 mass % to 0.5 mass % in the alloy material for a permanent magnet, sufficient magnetic properties can be achieved. When the content of carbon contained in the alloy material for a permanent magnet is greater than 0.5 mass %, there is a concern that the magnetic properties are significantly reduced. The content of carbon contained in the alloy material for a permanent magnet is preferably 0.005 mass % to 0.2 mass %.

The alloy material for a permanent magnet of this embodiment includes a plurality of R-T-B system alloys having different compositions and a metal powder. The alloy material may be formed only of the first alloy, the second alloy, and the metal powder, or, for example, in addition to the first alloy, the second alloy, and the metal powder, a third alloy formed of an R-T-B system alloy having a composition different from those of the first alloy and the second alloy may be further included.

The respective R-T-B system alloys which constitute the plurality of R-T-B system alloys having different compositions are obtained by a method including the steps of: producing cast alloy flakes by casting a molten alloy using a strip cast (SC) method; decrepitating the obtained cast alloy flakes using, for example, a hydrogen decrepitation method or the like; and performing pulverization with a pulverizer, or the like.

In this embodiment, the case has been described in which the R-T-B system alloy is produced using the SC method, but the respective R-T-B system alloys used in the invention are not limited to alloys produced using the SC method. For example, the respective R-T-B system alloys may be cast using a centrifugal casting method, a book mold method, or the like.

Examples of the hydrogen decrepitation method include a method including the steps of: storing hydrogen in cast alloy flakes at room temperature; performing a heat treatment at a temperature of about 300° C.; expelling the hydrogen by reducing the pressure; and removing the hydrogen in the cast alloy flakes by performing a heat treatment at a temperature of about 500° C. Since the cast alloy flakes storing the hydrogen in the hydrogen decrepitation method expand in volume, many cracks easily occur in the alloy and the cast alloy flakes are cracked.

Decrepitation of the plurality of kinds of cast alloy flakes which are a plurality of R-T-B system alloys having different compositions may be separately performed for each composition. Otherwise, some or all of the plurality of kinds of cast alloy flakes may be mixed and the plurality of kinds of cast alloy flakes may be simultaneously cracked.

In addition, examples of the method for pulverizing the hydrogen decrepitated cast alloy flakes include a method for finely pulverizing hydrogen decrepitated cast alloy flakes into a powder having an average grain size of 3 μm to 4.5 μm using, for example, 0.6 MPa of high-pressure nitrogen with a pulverizer such as a jet mill.

In the pulverization of the plurality of kinds of hydrogen decrepitated cast alloy flakes which are a plurality of R-T-B system alloys having different compositions, when some or all of the plurality of kinds of cast alloy flakes are mixed before hydrogen decrepitation, the plurality of kinds of cast alloy flakes are preferably simultaneously pulverized. However, the pulverization may be separately performed for each composition.

In addition, one or two or more selected from Al, Fe, Si, Ta, Ti, and Zr, an alloy containing the above metals, or the like can be used as the metal powder included in the alloy material for a permanent magnet. In addition, one or two or more selected from Al, Fe, Si, Ta, Ti, and Zr are preferably used as the metal powder included in the alloy material for a permanent magnet, in order to effectively improve wettability of the grain boundary phase in the R-T-B system magnet obtained using the alloy material for a permanent magnet to thereby improve the coercivity.

In order to improve coercivity (Hcj) without affecting other magnetic properties, the metal powder is preferably contained in an amount of 0.02 mass % to 6 mass %, and more preferably 0.2 mass % to 6 mass % in the alloy material for a permanent magnet. When the content of the metal powder in the alloy material for a permanent magnet is less than 0.02 mass %, there is a concern that an effect of improving the coercivity (Hcj) cannot be sufficiently obtained. In addition, it is not preferable that the content of the metal powder be greater than 6 mass %, because magnetic properties such as remanence (Br) and a maximum energy product (BHmax) are significantly reduced.

In addition, an average grain size (d50) of the metal powder included in the alloy material for a permanent magnet is preferably 0.01 μm to 200 μm. The metal powder in the alloy material for a permanent magnet may be finely and uniformly distributed, but may not be finely and uniformly distributed. For example, the metal powder may have a grain size of 1 μm or greater, or aggregate into aggregates having a size of 5 μm or greater.

The alloy material for a permanent magnet of this embodiment is preferably a mixture in which all of powders of the plurality of R-T-B system alloys having different compositions and the metal powder are mixed.

The plurality of R-T-B system alloys having different compositions and the metal powder which constitute the alloy material for a permanent magnet may be mixed in a state in which the plurality of R-T-B system alloys having different compositions are made into a powder formed of the R-T-B system alloys by pulverizing cast alloy flakes. However, for example, in a state in which the plurality of R-T-B system alloys having different compositions are cast alloy flakes, the plurality of R-T-B system alloys may be mixed with the metal powder to be an alloy material for a permanent magnet, and then the alloy material for a permanent magnet including the cast alloy flakes may be pulverized. In this case, the alloy material for a permanent magnet formed of the cast alloy flakes and the metal powder is preferably pulverized into a powder in the same manner as in the method for pulverizing the cast alloy flakes. In addition, in the mixing of the plurality of R-T-B system alloys having different compositions and the metal powder, all of the plurality of R-T-B system alloys having different compositions and the metal powder may be mixed at one time, but may be mixed in stages. For example, some of the plurality of R-T-B system alloys having different compositions which are in a state of cast alloy flakes may be mixed with the metal powder, and the remainder which is in a state of a powder may be mixed with the metal powder.

Next, a method for producing an R-T-B system rare earth permanent magnet using the alloy material for a permanent magnet obtained as described above will be described.

"Method for Producing R-T-B System Rare Earth Permanent Magnet"

Examples of the method for producing an R-T-B system magnet of this embodiment include a method including the steps of: adding 0.02 mass % to 0.03 mass % of zinc stearate as a lubricant to the above-described alloy material for a permanent magnet; performing pressing using a pressing machine or the like in a transverse magnetic field; performing sintering at 1030° C. to 1200° C. in vacuum; and performing a heat treatment at 400° C. to 800° C.

As described above, the mixing of the plurality of R-T-B system alloys having different compositions and the metal powder may be performed in a state in which the plurality of R-T-B system alloys having different compositions are cast alloy flakes, or in a state in which a powder formed of the R-T-B system alloys is prepared by pulverizing cast alloy flakes. However, for example, the mixing may be performed after addition of a lubricant such as zinc stearate to a powder formed of the plurality of R-T-B system alloys having different compositions.

The alloy material for a permanent magnet of this embodiment includes the plurality of R-T-B system alloys having different compositions and the metal powder, the respective R-T-B system alloys are formed of R which is composed of two or more kinds selected from rare earth elements, T which is composed of a transition metal essentially containing Fe, B, and unavoidable impurities, the first alloy having the greatest Dy content among the plurality of R-T-B system alloys contains 17 mass % or greater of Dy, and a Dy concentration difference between the first alloy and the second alloy having the least Dy concentration difference with respect to the first alloy among the plurality of R-T-B system alloys is 5 mass % or greater. Accordingly, it is possible to realize an R-T-B system rare earth permanent magnet with a high orientation rate and high coercivity which is favorably used in a motor and has excellent magnetic properties.

In addition, since the method for producing an R-T-B system rare earth permanent magnet of this embodiment is a method for producing an R-T-B system rare earth permanent magnet by molding and sintering the alloy material for a permanent magnet of this embodiment, an R-T-B system rare earth permanent magnet having excellent magnetic properties can be obtained.

EXAMPLES

An Nd metal (having a purity of 99 wt % or greater), a Dy metal (having a purity of 99 wt % or greater), ferroboron (Fe 80%, B 20 w %), a Co metal (having a purity of 99 wt % or greater), an Al metal (having a purity of 99 wt % or greater), a Cu metal (having a purity of 99 wt % or greater), and iron lump (having a purity of 99 wt % or greater) were weighted to obtain component compositions of alloys A to D shown in Table 1, and charged in an alumina crucible

TABLE 1

|   | Total R | Nd | Dy | B | Co | Al | Cu | Fe (wt %) |
|---|---------|------|------|------|-----|------|------|------|
| A | 30.0 | 30.0 | 0.0 | 0.94 | 1.0 | 0.15 | 0.10 | bal. |
| B | 31.0 | 27.0 | 4.0 | 0.94 | 1.0 | 0.15 | 0.10 | bal. |
| C | 31.0 | 22.0 | 9.0 | 0.94 | 1.0 | 0.15 | 0.10 | bal. |
| D | 33.0 | 9.0 | 24.0 | 0.94 | 1.0 | 0.15 | 0.10 | bal. |

Thereafter, the alumina crucible was put in a high-frequency vacuum induction furnace, the air in the furnace was replaced by Ar, and heating to 1450° C. was performed to melt the metals to thereby obtain a molten metal. Next, the molten metal was poured into a water-cooled copper roll, and cast alloy flakes in which an average thickness was controlled to about 0.3 mm, an R-rich phase (rare earth-rich phase) interval was controlled to 3 µm to 15 µm, and a volume fraction of phases other than R-rich phases (main phase) was controlled to be equal to or greater than (138−1.6r) (where r represents the content of rare earthes (Nd and Dy)) were obtained at a roll rotating speed of 1.0 msec using a strip cast (SC) method.

The R-rich phase interval and the volume fraction of the main phase of the cast alloy flakes obtained as described above were checked by the following method.

That is, cast alloy flakes having a thickness falling within ±10% of the average thickness were embedded in a resin and grinded, and a backscattered electron image was taken using a scanning electron microscope (JEOL JSM-5310) to obtain a photograph magnified 300 times. The R-rich phase interval was measured and the volume fraction of the main phase was calculated using the obtained photograph of the cast alloy flakes. As a result, the R-rich phase interval of the alloys A to D shown in Table 1 was 4 µm to 5 µm, and the volume fraction of the main phase was 90% to 95%.

Next, cast alloy flakes of the alloys A to D shown in Table 1 were weighted and mixed at mixing ratios shown in Table 2, respectively, using a V-blender constituted by a V-shaped tube. Compositions (compositions after mixing) of Alloys 1 to 3 obtained by mixing the cast alloy flakes of the alloys A to D are shown in Table 2. Alloy 4 shown in Table 2 is the alloy C shown in Table 1.

TABLE 2

| Alloy No. | Mixing Ratio | Composition After Mixing (wt %) | | | | | | |
|---|---|---|---|---|---|---|---|---|
| | | R Total | Nd | Dy | B | Co | Al | Cu | Fe |
| 1 | A; 50.0%-B; 50.0% | 30.5 | 28.5 | 2.0 | 0.94 | 1.0 | 0.15 | 0.10 | bal. |
| 2 | A; 83.4%-D16.6% | 30.5 | 26.5 | 4.0 | 0.94 | 1.0 | 0.15 | 0.10 | bal. |
| 3 | B; 75.0%-D; 25.0% | 31.5 | 22.5 | 9.0 | 0.94 | 1.0 | 0.15 | 0.10 | bal. |
| 4 | C; 100% | 31.0 | 22.0 | 9.0 | 0.94 | 1.0 | 0.15 | 0.10 | bal. |

Next, the cast alloy flakes were coarsely pulverized to have a diameter of about 5 mm and inserted in hydrogen at room temperature to store the hydrogen. The coarsely pulverized cast alloy flakes storing the hydrogen were heat-treated at 300° C. to be hydrogen decrepitated. Thereafter, the pressure was reduced to expel the hydrogen, a heat treatment for heating to 500° C. was performed to discharge and remove the hydrogen in the cast alloy flakes, and cooling to room temperature was performed.

Next, 0.025 wt % of zinc stearate as a lubricant was added to the hydrogen decrepitated cast alloy flakes, and the hydrogen decrepitated cast alloy flakes were finely pulverized into a powder having an average grain size of 4.5 µm using 0.6 MPa of high-pressure nitrogen with a jet mill (HOSOKAWA MICRON 100AFG).

A metal powder having an average grain size shown in Table 3 was added to the powder (Alloys 1 to 4) formed of the R-T-B system alloys obtained as described above, and mixed therewith at a ratio (concentration (mass %) of the metal powder included in the alloy material for a permanent magnet) shown in Table 4 to produce an alloy material for a permanent magnet. The grain size of the metal powder was measured by a laser diffractometer.

TABLE 3

| Metal Powder | Average Grain Size (µm) |
|---|---|
| Al | 48 |
| Fe | 6 |
| Si | 20 |
| Ta | 12 |
| Ti—Al | 170 |
| Ti | 25 |
| Zr | 31 |

Next, the alloy material for a permanent magnet obtained as described above was pressed into a green body at a pressure of 0.8 t/cm² using a pressing machine in a transverse magnetic field, and sintered in vacuum. The sintering temperature varied with the alloy. Alloy 1 was sintered at 1050° C. to 1060° C., Alloy 2 was sintered at 1060° C. to 1080° C., and Alloys 3 and 4 were sintered at 1080° C. to 1110° C. Thereafter, a heat treatment was performed at 800° C. and 530° C. and cooling was then performed, whereby R-T-B system magnets of Test Examples 1 to 20 shown in Table 3 were obtained.

Magnetic properties of each of the obtained R-T-B system magnets of Test Examples 1 to 20 were measured by a BH curve tracer (Toei Industry Co., Ltd. TPM2-10). The results thereof are shown in Table 4.

TABLE 4

| Test Example | Alloy | Added Metal Powder | Amount (wt %) | Hcj (kOe) | Improving Rate (%) | Br (kG) | Br/Js (%) | SR (%) | BHmax (MGOe) |
|---|---|---|---|---|---|---|---|---|---|
| 1 | 1 | None | 0.00 | 18.5 | — | 13.8 | 94.3 | 95.6 | 48.0 |
| 2 |   | Al | 0.20 | 19.8 | 7.0 | 13.6 | 94.7 | 95.2 | 48.2 |
| 3 | 2 | None | 0.00 | 22.8 | — | 12.9 | 94.9 | 95.9 | 40.3 |
| 4 |   | Fe | 0.20 | 24.0 | 5.4 | 12.8 | 95.2 | 95.0 | 41.0 |
| 5 |   | Ta | 2.00 | 25.1 | 10.3 | 12.8 | 94.9 | 95.5 | 39.5 |
| 6 |   |   | 6.00 | 26.0 | 14.2 | 12.5 | 94.8 | 94.0 | 38.8 |
| 7 | 3 | None | 0.00 | 30.0 | — | 11.7 | 95.3 | 94.6 | 33.6 |
| 8 |   | Fe | 1.00 | 34.3 | 14.3 | 11.7 | 94.8 | 94.9 | 33.3 |
| 9 |   |   | 2.00 | 32.9 | 9.6 | 11.6 | 94.9 | 95.4 | 33.1 |
| 10 |   | Ta | 2.00 | 34.7 | 15.5 | 11.6 | 94.9 | 95.0 | 32.8 |
| 13 |   | Si | 0.20 | 32.8 | 9.3 | 12.0 | 95.2 | 95.2 | 34.9 |
| 14 |   | Ti—Al | 0.20 | 33.0 | 9.8 | 11.9 | 95.1 | 94.9 | 34.9 |
| 15 |   | Al | 0.01 | 32.6 | 8.7 | 11.7 | 95.1 | 95.0 | 34.0 |
| 16 |   |   | 0.20 | 32.8 | 9.3 | 11.6 | 95.3 | 94.8 | 34.8 |
| 17 |   | Ti | 0.20 | 32.2 | 7.3 | 11.6 | 94.9 | 95.0 | 34.0 |
| 18 |   | Zr | 0.20 | 32.3 | 7.7 | 11.7 | 95.1 | 95.1 | 33.9 |
| 19 | 4 | None | 0.00 | 29.8 | — | 11.7 | 93.6 | 90.8 | 33.2 |
| 20 |   | Fe | 1.00 | 31.0 | 3.9 | 11.7 | 93.6 | 90.1 | 33.3 |

In Table 3, "Hcj" represents coercivity, "Br" represents magnetization, "SR" represents squareness, and "BHmax" represents a maximum energy product. Each of the values of these magnetic properties is an average of measured values of five R-T-B system magnets.

In addition, "Js" represents saturation of magnetization of a substance at the temperature due to saturated magnetization, and in this example, it is measured by applying a magnetic field of 10 T. "Bras" represents an orientation rate and is an index indicating alignment of crystals in the magnet with respect to a magnetization easy axis. The orientation rates of the R-T-B system magnets of Test Examples 1 to 20 are shown in FIG. 1.

As shown in Table 4, Test Example 2 is a comparative example of the invention in which 0.2 wt % of Al is added to Alloy 1 in which a Dy content of an R-T-B system alloy (alloy B in Table 1) having the greatest Dy content is less than 17 mass %. In addition, Test Example 16 is an example of the invention in which 0.2 wt % of Al is added to Alloy 3 in which a Dy content of an R-T-B system alloy (alloy D in Table 1) having the greatest Dy content is 17 mass % or greater and a Dy concentration difference between two kinds of R-T-B system alloys is 5 mass % or greater.

When comparing Test Examples 2 and 16 having the same amount of Al added thereto, in Test Example 2 (Alloy 1 in Table 2), the width of an improvement in coercivity (Hcj) due to the addition of Al is 1.3 kOe, and in Test Example 16 (Alloy 3 in Table 2), the width of an improvement in coercivity (Hcj) due to the addition of Al is 2.8 kOe. Accordingly, Test Example 16 is twice or more Test Example 2 in terms of the width of an improvement in coercivity due to the addition of Al.

In addition, as shown in Table 4, both of Test Examples 7 and 19 are comparative examples of the invention including no metal powder. As shown in Tables 2 and 4, both of Alloy 3 of Test Example 7 and Alloy 4 of Test Example 19 have a Dy concentration of 9 mass % in the composition after mixing, and have the same coercivity.

In addition, as shown in Table 4, Test Example 8 is an example of the invention in which 1 wt % of Fe is added to Alloy 3. In addition, Test Example 20 is a comparative example of the invention in which 1 wt % of Fe is added to Alloy 4 formed of one kind of R-T-B system alloy (Alloy C in Table 1). When comparing Test Examples 8 and 20 having the same amount of Fe added thereto, in Test Example 8, the coercivity (Hcj) is 34.3 kOe and improved by 4.3 kOe, as compared with Test Example 7 including no metal powder. In Test Example 20, the coercivity is 31 kOe and improved by 1.2 kOe, as compared with Test Example 19 including no metal powder.

Accordingly, according to the invention, it is found that coercivity of an R-T-B system magnet can be improved without increasing the content of Dy contained in the composition when all of a plurality of R-T-B system alloys having different compositions are mixed.

In addition, the orientation rate (Br/Js) of Test Example 8 is 94.8%, the orientation rate (Br/Js) of Test Example 20 is 93.6%, and Test Example 8 exhibits a higher orientation rate.

Accordingly, it is found that it is possible to obtain an R-T-B system magnet having high coercivity and a high orientation rate by pressing and sintering the alloy material for an R-T-B system rare earth permanent magnet of the invention.

In addition, from FIG. 1, it is found that Examples 1 to 18 using Alloys 1 to 3 formed of two kinds of R-T-B system alloys exhibit a high orientation rate, as compared with Examples 19 and 20 using Alloy 4 formed of one kind of R-T-B system alloy (Alloy C in Table 1).

Furthermore, it is found that Examples 3 to 18 using Alloys 2 and 3 in which a Dy content of an R-T-B system alloy (Alloy B in Table 1) having the greatest Dy content is 17 mass % or greater and a Dy concentration difference between two kinds of R-T-B system alloys is 5 mass % or greater exhibit a high orientation rate, as compared with Examples 1 and 2 using Alloy 1 in which a Dy content of an R-T-B system alloy (Alloy B in Table 1) having the greatest Dy content is less than 17 mass %.

INDUSTRIAL APPLICABILITY

The invention can be applied to an alloy material for an R-T-B system rare earth permanent magnet, a method for producing an R-T-B system rare earth permanent magnet, and a motor.

The invention claimed is:

1. An alloy material for an R-T-B system rare earth permanent magnet, comprising:
    a plurality of R-T-B system alloys having different compositions; and
    a metal or a semi-metallic powder,
    wherein the respective R-T-B system alloys are formed of R which is composed of two or more kinds selected from rare earth elements, T which is composed of a transition metal essentially containing Fe, B, and unavoidable impurities, a first alloy having the greatest Dy content among the plurality of R-T-B system alloys contains 17 mass % or greater of Dy, and a Dy concentration difference between the first alloy and a second alloy having the least Dy concentration difference with respect to the first alloy among the plurality of R-T-B system alloys is 5 mass % or greater,
    wherein the metal or semi-metallic powder includes one or more selected from Si, Ta, and Ti, or an alloy containing one or more selected from Si, Ta and Ti.

2. The alloy material for an R-T-B system rare earth permanent magnet according to claim 1,
    wherein the metal or semi-metallic powder is included in an amount of 0.02 mass % to 6 mass %.

3. The alloy material for an R-T-B system rare earth permanent magnet according to claim 1,
    wherein a Dy content in the composition when all of the plurality of R-T-B system alloys having different compositions are mixed is 2 mass % to 20 mass %.

4. A method for producing an R-T-B system rare earth permanent magnet, the method comprising the steps of:
    pressing the alloy material for an R-T-B system rare earth permanent magnet according to claim 1, and
    sintering the alloy material.

5. A motor comprising:
    an R-T-B system rare earth permanent magnet which is produced by the method for producing an R-T-B system rare earth permanent magnet according to claim 4.

* * * * *